April 1, 1969 W. G. PLATT ET AL 3,436,736
AUTOMATIC DATA PROCESSING UNIT
Filed Sept. 22, 1966

INVENTORS:
HENRY G. TUCKER
WILLIAM G. PLATT

ATTORNEYS

INVENTORS:
HENRY G. TUCKER
WILLIAM G. PLATT

ATTORNEYS

United States Patent Office 3,436,736
Patented Apr. 1, 1969

3,436,736
AUTOMATIC DATA PROCESSING UNIT
William G. Platt, Stratford, and Henry G. Tucker, Norwalk, Conn., assignors to Remington Arms Company, Inc., Bridgeport, Conn., a corporation of Delaware
Filed Sept. 22, 1966, Ser. No. 581,281
Int. Cl. G11b 13/00
U.S. Cl. 340—172.5                    6 Claims

ABSTRACT OF THE DISCLOSURE

An automatic data processing unit for use with a drug dispensing machine. The basic dispensing machine is equipped to dispense drugs and to produce printed records of the delivery of such drugs only in response to introduction into the machine of embossed printing plates identifying patient, nurse, and drug. For automatic data processing the plates identifiying patient and drug are in addition provided with coded information in the form of code holes and transmit the data derived therefrom to one or more remoter stations during the interval in which the printed record is being produced in the machine.

---

This invention relates to an automatic data processing unit and in particular to such a unit intended for use with a drug dispensing machine.

In recent years much attention has been given to the control of drugs in hospitals. The need for such control has been twofold. Positive means are needed to insure that the prescribed drug is administered to the proper patient and inventory controls are needed to prevent the theft of drugs from the hospitals.

Various components of a unit to accomplish the above is described and claimed in United States Patent No. 3,183,834 issued May 18, 1965, to Marmor et al. and United States Patent No. 3,196,276 issued July 20, 1965, to Naab. The overall unit for drug control is set forth in an abandoned application entitled "Inventory Control System and Apparatus," Ser. No. 162,630 filed Dec. 12, 1961, in the names of Frederic T. C. Brewer, William A. White and Walter E. Colburn, all assigned to Brewer Pharmacal Engineering Corporation, Upper Darby, Pa.

The drug dispensing and control system set forth in the above patents and abandoned application has practically eliminated the theft of drugs when used, and also, practically eliminated the chance of a patient being administered the wrong drug. While the unit records on an internal tape by printing with embossed plates all transactions, hospitals using the unit have requested that it be changed to also make a record of each transaction in a manner that can be used with their data processing equipment.

The main object of the present invention is to provide an automatic data processing unit for use with a drug dispensing machine which will read out coded information for data transmission and provide printed information for local use both within a single machine cycle.

A further object of this invention is to provide an automatic data processing unit for use with a drug dispensing machine which permits the drug dispensing machine to operate in a normal manner even though no data can be transmitted during the operation due to an error condition in the automatic data transmitting unit.

Another object of this invention is to provide a data processing unit using plates containing both embossed and coded information.

Still another object of this invention is to provide a data processing unit having a moveable scanner head which traverses the code field to transmit data while at the same time providing a printed record of the embossed information on the plates.

It is contemplated that these objectives may best be achieved by providing a unit having a shuttle to hold the embossed and coded plates in position for printing and readout of code holes. The unit includes a scan head which is driven by means of a motor across the coded section of the plates. The scanner carries optic devices with it to transmit light from a source and direct it through any code holes in the plates. The light passing through the holes impinges on photocells to actuate them for code transmission. A roller is adapted from those described in the patents above referred to and driven by a second motor so as to press a pressure sensitive tape or other recording media over the embossed section of the plates during a single cycle of machine operation which includes the scanning of the coded data.

Other objects and advantages of this invention will become apparent as the following description proceeds and the features of novelty which characterize this invention will be pointed out with particularity in the claims annexed to and forming part of this specification.

Figure 1:
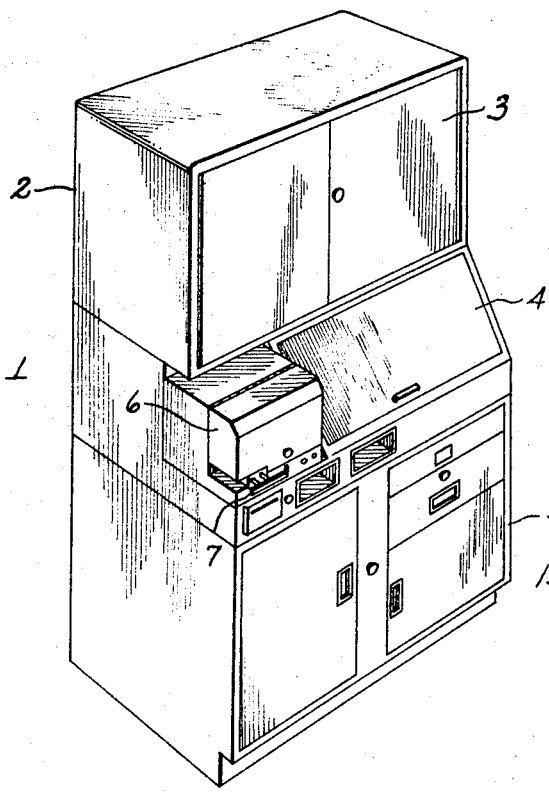
FIGURE 1 is a perspective view of a drug dispensing apparatus with which the present invention can be used.
Figure 2:
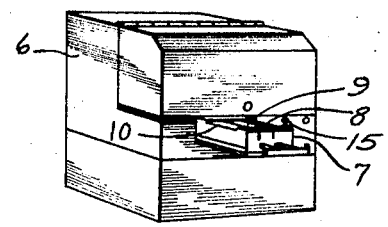
FIGURE 2 is a perspective view of a charge recorder for a drug dispensing unit and which includes the present invention.
Figure 3:
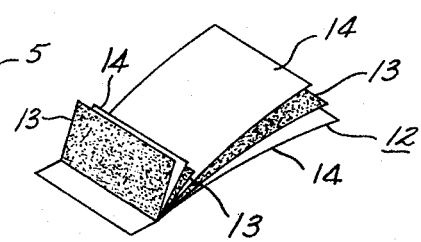
FIGURE 3 is a perspective view of a typical charge voucher adapted for use with the present invention.
Figure 4:
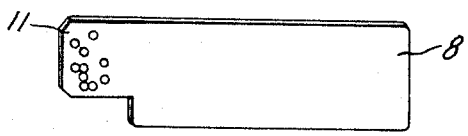
FIGURE 4 is a top plan view of a patient plate for use with the present invention.
Figure 5:
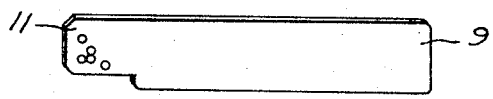
FIGURE 5 is a top plan view of a drug plate for use with the present invention.
Figure 6:
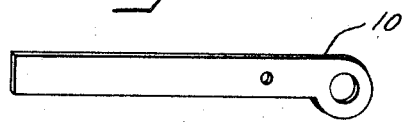
FIGURE 6 is a top plan view of a nurse's I.D. bar for use with the present invention.

Reference may now be had to the drawings wherein an article or drug dispensing unit 1 corresponding generally to that illustrated in Patent No. 3,196,276 is shown in FIG. 1. Article storing and ejection bins are provided in cabinet 2 behind locked doors 3. While these bins may be of any convenient construction, it is preferred to provide them in accordance with those shown and described in the application of Richard I. Kester, entitled "Article Storing and Issuing Apparatus," Ser. No. 187,636 filed Apr. 16, 1962, now abandoned and assigned to Brewer Pharmacal Engineering Corporation, Upper Darby, Pa. A drug selection console and storage for drug plates is provided behind door 4. A base 5 is provided and can be used for storage of miscellaneous items.

A charge recorder 6 is positioned in unit 1 and includes the electromechanical scanner of the present invention. Recorder 6 includes a shuttle 7 which is arranged to receive a patient plate 8, drug plate 9 and nurse's I.D. bar 10. Plates 8 and 9 have one section to contain embossed information and a second section that contains coded information in the form of punched holes 11 while bar 10 contains only embossed information.

The embossed information is used to generate printed information within recorder 6. This is accomplished by means of a voucher 12 having a plurality of carbon sheets 13 to imprint the embossed information on the plates and bar to sheets 14 and an internal tape which produces a record within the machine as described in Patent No. 3,183,834. When it is desired to obtain a drug for a patient from dispenser 1, the nurse obtains the proper drug plate 9 and inserts this with the patient's plate 8 along with her own I.D. bar 10 in shuttle 7. A voucher 12 is then placed on top of the shuttle 7 and shuttle 7 is pushed into recorder 6 to operate the unit as will be explained later and as is set forth in the patents and applications referred to above. After shuttle 7 has been pushed into recorder 6 conditioning dispenser 1 for a cycle of operation, start button 15 is pressed to cause operation of the unit and cause it to dispense a drug while making a printed record of the transaction on both the removable vouchers and the internal tape and also transmitting the coded information to a remote station for operating a card punch or other recording device. In dispensing the drug and in recording the embossed information within the recorder the device operates as described in the patents above referred to.

Figure 7:
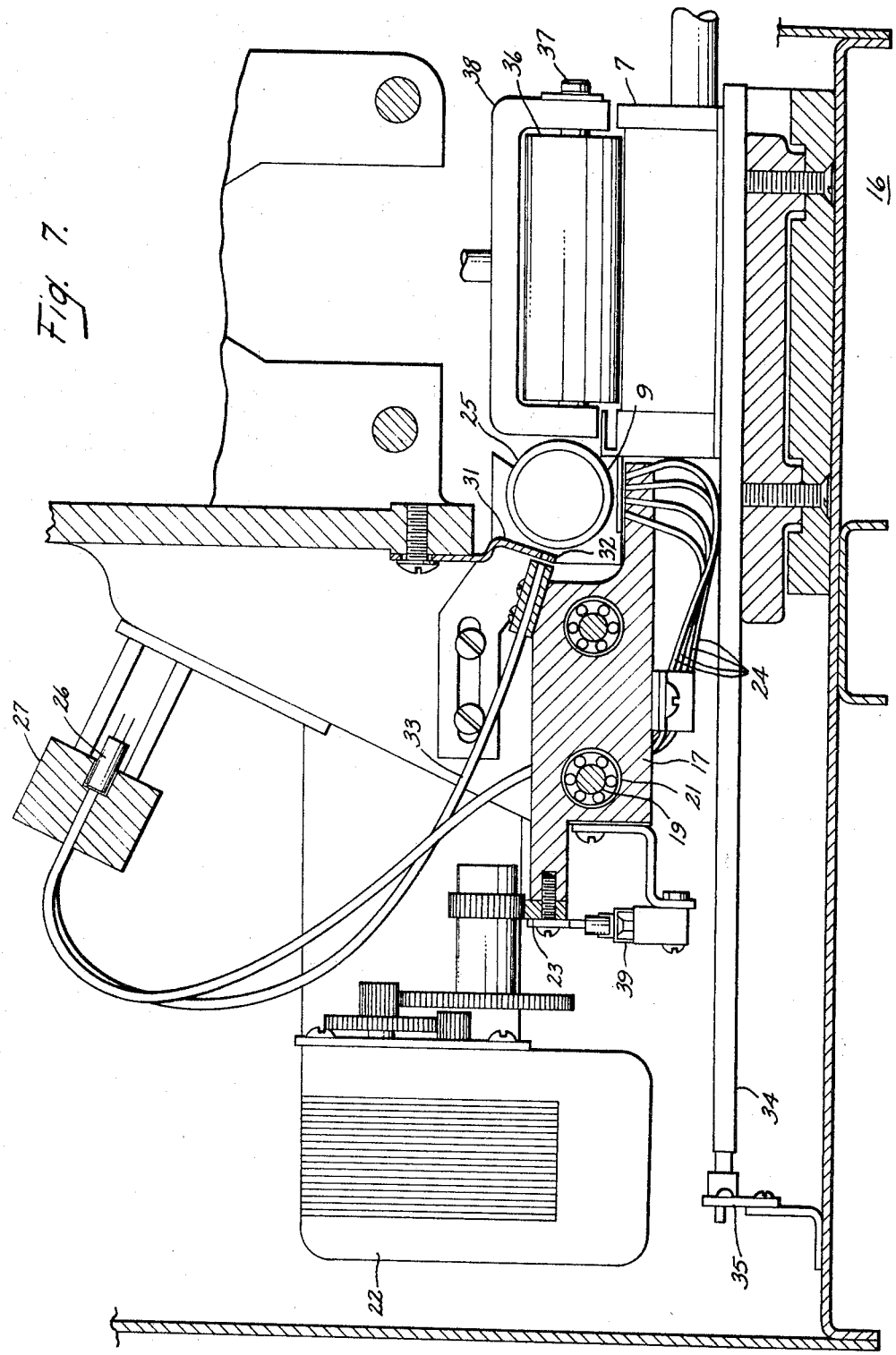
FIGURE 7 is a front elevation view of the electromechanical scanner of the present invention removed from its housing and with parts broken away more clearly to show the details of its construction.
Figure 8:
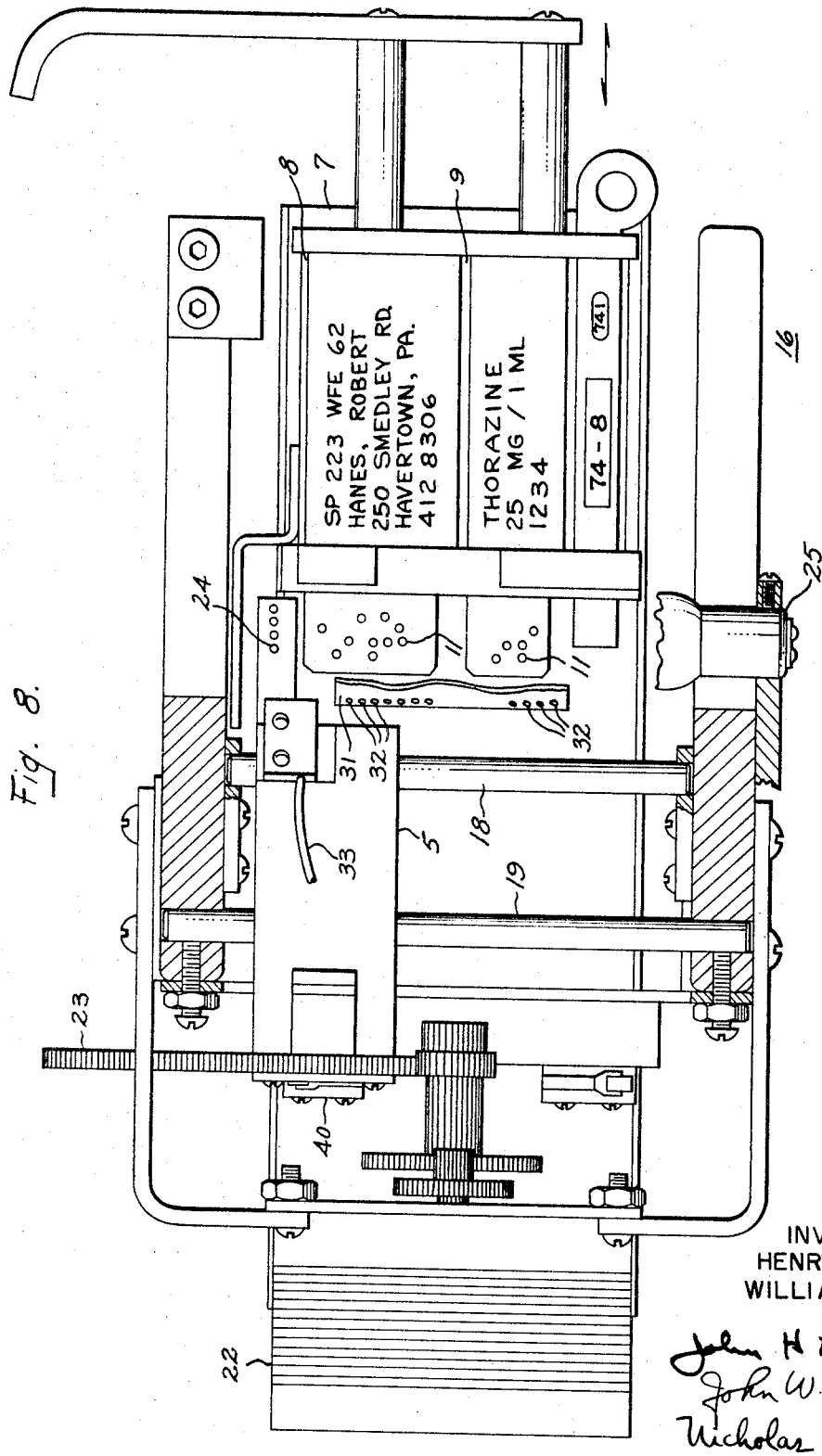
FIGURE 8 is a top plan view of the electromechanical scanner of the present invention removed from its housing and with parts broken away more clearly to show the details of its construction.
Figure 9:
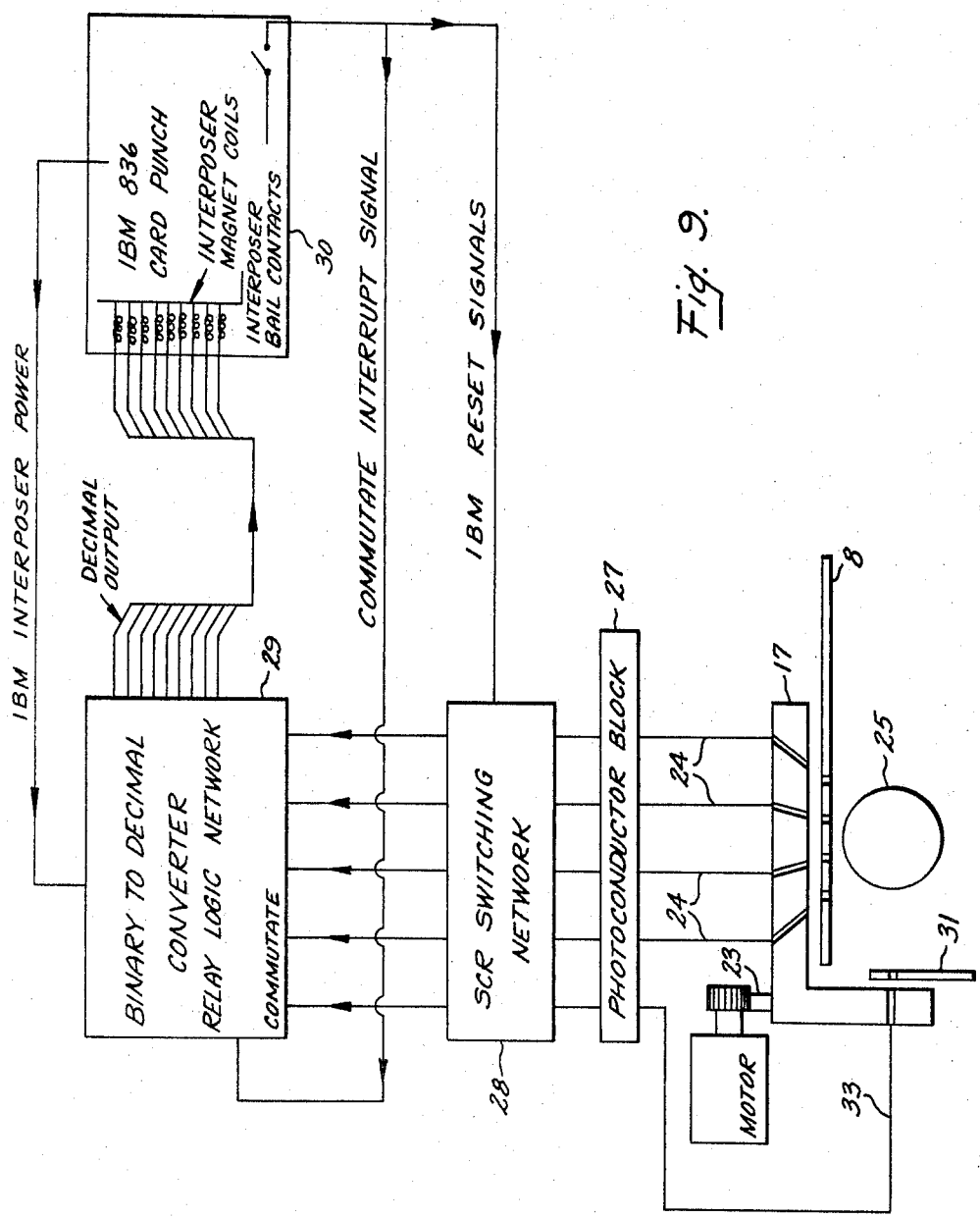
FIGURE 9 is a block diagram showing the connection between the present invention and a card punch control system.

The electromechanical scanner 16 which forms the present invention is set forth in detail in FIGS. 7 and 8. Scanner 16 includes a moving scan head 17 movably mounted on shafts 18 and 19 with bearings 20 and 21 and driven by a motor 22 through gears and a rack 23 in a direction perpendicular to the surface of the paper in FIG. 7. Head 17 carries with it a series of fiber optic elements 24 arranged to move beneath the coded section of plates 8 and 9.

A light bulb 25 with a straight line tungsten filament is positioned above the coded ends of plates 8 and 9. Light from the bulb will pass through code holes 11 and impinge on fiber optic elements 24 as the scan head 17 is driven across plates 8 and 9. Elements 24 transmit the light to photocells 26 contained in block 27 switching them to a conductive condition. Photocells 26 when switched on by light traveling through elements 24 in turn send a signal to the silicon rectifier switching network 28. The signal received by network 28 is stored until a signal is received indicating everything is set for transmission of the signal to relay logic network 29.

Once the binary signal is received by network 29 it is converted to a decimal signal and fed to a device such as an IBM 836 card punch 30 which produces a punched card record of the transaction. To insure that network 28 only transmits actual signals it is not turned on until slightly after photocells 26 are switched on. This is accomplished by providing a commutator plate 31 which contains a series of openings 32. A trigger fiber optic 33 is carried by head 17 and passes by openings 32 to receive light from bulb 25. Openings 32 are positioned so that light reaches trigger optic 33 slightly after fiber optic elements 24 receive light from a line of code holes 11. Light passing through trigger optic 33 switches a photocell 26 on which is contained in block 27. This signal is transmitted to network 28 switching it on or in condition to transmit signals to network 29.

It can, therefore, be seen that when a drug is needed the nurse first pulls shuttle 7 out of recorder 6 and places the patient plate 8, drug plate 9 and her I.D. bar 10 in the proper place in the shuttle. A voucher 12 is then placed on top of the plates in shuttle 7 and shuttle 7 is pushed back into recorder 6. An elongated bar 34 is attached to shuttle 7 and in the ready to operate position shown in FIG. 7 engages and closes shuttle switch 35 turning recorder 6 and electromechanical scanner 16 on. When start button 15 is depressed motor 22 is energized driving scan head 17 as previously explained. Also, as set forth above, this action generates a punched card record of the transaction.

In order to provide a local printed record of the transaction a roller 36 is contained in recorder 6. Roller 36 is mounted on a shaft 37 which in turn is mounted in a U-shaped frame 38. Frame 38 is movably positioned above shuttle 7 so that when it moves in the same direction as head 17, roller 36 presses against voucher 12 pressing it into contact with the embossed section of plates 8 and 9 and bar 10. This action causes the embossed information on the plates to be recorded on sheets 14 by means of carbon 13 and, as described in Patent No. 3,183,834, on an internal tape recording medium.

When head 17 reaches its extreme limit of travel, which would be out of the paper in FIG. 7, it engages switch 39 which reverses the direction of motor 22 carrying head 17 back to its home position. At home position head 17 engages switch 40 which deenergizes motor 22. Frame 38 can be actuated by motor 22 or it can be actuated by a separate motor with controls similar to the controls set forth for motor 22 but in either case its operation is initiated at the same time as the electromechanical scanner for the data transmission system so that the two records are being made substantially simultaneously.

While one embodiment is shown in which the light is positioned so as to shine directly through the code holes of the patient and drug plates onto fiber optic devices which transmit the light to photocells, other arrangements can be utilized to accomplish the same result. One such arrangement which has been used is to mount the light source remote from the plates and conduct the light to the code holes by means of fiber optic devices. In such a setup, the photocells are positioned below the plates so that light passing through the code holes impinges directly on the photocells.

What is claimed is:

1. An automatic data processing unit for use with a drug dispensing machine comprising a frame upon which is mounted a shuttle, said shuttle being adapted to hold patient, drug and nurse identification plates and a pressure sensitive recording media, said patient and drug plates containing coded information in the form of code holes and also containing embossed information, a scanning head movably mounted on said frame and driven by a motor, a light source positioned to direct its light through the code holes of said patient and drug plates, light detecting and transmitting means carried by said scanning head to traverse said code holes and detect light passing through said holes, code transmission means mounted on said frame remote from said plates, said transmission means actuated by light received by said detecting means to transmit said coded information to record making receiving means located remote from said data processing unit, printing means movably mounted on said frame driven during the operation of said scanning head to traverse the embossed information section of said plates, said printing means pressing said recording media against said embossed information whereby a coded record of a transaction of said drug dispensing machine is generated in a device remote from said data processing unit and a complete printed record of said transaction is substantially simultaneously generated within said data processing unit.

2. The unit set forth in claim 1, wherein said shuttle is slidably mounted on said frame between a first position in which it is within said unit and a second position out of said unit whereby said plates and said recording media may be placed in said shuttle.

3. The unit set forth in claim 1, wherein said scanning head is movably mounted on a plurality of shafts and is driven by means of a motor having gearing connected to its shaft which engages a rack mounted on said head to thereby cause movement of said head in response to rotation of said motor shaft in either direction.

4. The unit set forth in claim 1, wherein said light detecting means is a plurality of fiber optics.

5. The unit set forth in claim 1, wherein said code transmission means is a plurality of photocells normally nonconductive and are switched to a conductive state by light directed to them by said light detecting and transmitting means.

6. The unit set forth in claim 1, wherein said printing means is a roller mounted on a shaft so as to be free to rotate, said shaft mounted in a frame member which is driven by a motor so as to press said roller against said recording media and said embossed section of said plates.

References Cited

UNITED STATES PATENTS

| Re. 25,254 | 10/1962 | Harris. | |
|---|---|---|---|
| 2,938,666 | 5/1960 | Rand | 250—219 |
| 3,036,765 | 5/1962 | Jones et al. | 250—219 |
| 3,061,143 | 10/1962 | Simjian | 221—2 |
| 3,183,834 | 5/1965 | Marmor et al. | 101—260 |
| 3,335,407 | 8/1967 | Lange et al. | 340—172.5 |
| 3,358,824 | 12/1967 | Stagnitto | 235—61.12 |

FOREIGN PATENTS 687,569  5/1964  Canada.

OTHER REFERENCES

Rohland, W. S.: Sensing Apparatus. In IBM Technical Disclosure Bulletin 7(6): pp. 476–477, November 1964.

ROBERT C. BAILEY, *Primary Examiner.*

JOHN P. VANDENBURG, *Assistant Examiner.*

U.S. Cl. X.R.

194—4; 206—47; 235—61.6